US010917033B2

(12) United States Patent
Rodrigues

(10) Patent No.: US 10,917,033 B2
(45) Date of Patent: *Feb. 9, 2021

(54) ROOF INTEGRATED PHOTOVOLTAIC SYSTEM

(71) Applicant: Building Materials Investment Corporation, Dallas, TX (US)

(72) Inventor: Tommy F. Rodrigues, Nutley, NJ (US)

(73) Assignee: Building Materials Investment Corporation, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/904,759

(22) Filed: Jun. 18, 2020

(65) Prior Publication Data

US 2020/0321907 A1    Oct. 8, 2020

Related U.S. Application Data

(63) Continuation of application No. 16/160,598, filed on Oct. 15, 2018, now Pat. No. 10,693,413.

(Continued)

(51) Int. Cl.
*H02S 20/25* (2014.01)
*E04D 1/22* (2006.01)
(Continued)

(52) U.S. Cl.
CPC ............... *H02S 20/25* (2014.12); *E04D 1/22* (2013.01); *E04D 1/30* (2013.01); *E04D 1/34* (2013.01);
(Continued)

(58) Field of Classification Search
CPC . H02S 20/25; H02S 40/36; E04D 1/34; E04D 1/30; E04D 2001/3458;
(Continued)

(56) References Cited

U.S. PATENT DOCUMENTS 4,040,867 A    8/1977  Forestieri et al.
7,625,238 B2 * 12/2009  Duesterhoeft .......... H02S 40/34
                                                439/620.22

(Continued)

FOREIGN PATENT DOCUMENTS

CA         2846540        9/2015
CN       104428906 A      3/2015

*Primary Examiner* — Adriana Figueroa
(74) *Attorney, Agent, or Firm* — Womble Bond Dickinson (US) LLP

(57) ABSTRACT

A roof integrated photovoltaic (RIPV) system has a plurality of solar tiles that are mounted to a roof. The tiles may be mounted using a metal batten and hanger system or some other attachment system. Each tile has an electrical edge junction extending rearwardly from its top edge. The edge junction is coextensive with or contains the plane of the solar tile and may be slightly thicker than the solar tile. Sockets on opposed ends of the edge junction receive plugs of electrical cables for interconnecting the array of solar tiles together electrically. The edge junctions provide for a low profile installation that mimics the appearance of a traditional roofing tile such as a slate tile. The slightly thicker edge junctions may raise solar tiles of one course above the surfaces of solar tiles of a next lower course to provide ventilation for the RIPV array and to provide accommodating space for system wiring.

18 Claims, 5 Drawing Sheets

Related U.S. Application Data

(60) Provisional application No. 62/574,560, filed on Oct. 19, 2017.

(51) Int. Cl.
| | | |
|---|---|---|
| *E04D 15/02* | (2006.01) | |
| *H02S 40/36* | (2014.01) | |
| *E04D 1/30* | (2006.01) | |
| *E04D 1/34* | (2006.01) | |

(52) U.S. Cl.
CPC ............ *E04D 15/02* (2013.01); *H02S 40/36* (2014.12); *E04D 2001/308* (2013.01); *E04D 2001/3411* (2013.01); *E04D 2001/3458* (2013.01); *E04D 2001/3473* (2013.01)

(58) Field of Classification Search
CPC ....... E04D 2001/3411; E04D 2001/308; E04D 1/22; E04D 2001/3473; E04D 15/02
See application file for complete search history.

(56) References Cited

U.S. PATENT DOCUMENTS

| | | | |
|---|---|---|---|
| 7,713,089 B2 | 5/2010 | Faust et al. | |
| 7,918,694 B1 | 4/2011 | Stahl et al. | |
| 8,003,882 B2 | 8/2011 | Pisklak et al. | |
| 8,168,880 B2 | 5/2012 | Jacobs et al. | |
| 8,215,070 B2 * | 7/2012 | Railkar | E04D 12/004 52/173.3 |
| 8,291,654 B2 | 10/2012 | Botkin et al. | |
| 8,309,840 B2 | 11/2012 | Stevens et al. | |
| 8,507,784 B2 | 8/2013 | White | |
| 8,586,856 B2 | 11/2013 | Kalkanoglu et al. | |
| 8,656,657 B2 * | 2/2014 | Livsey | H02S 20/23 52/173.3 |
| 8,695,289 B2 | 4/2014 | Koch et al. | |
| 8,695,291 B2 | 4/2014 | Pisklak et al. | |
| 8,697,981 B2 | 4/2014 | Adriani et al. | |
| 8,853,520 B2 * | 10/2014 | Ueda | H02S 20/23 136/244 |
| 8,904,717 B2 | 12/2014 | Lenox | |
| 8,938,920 B2 | 1/2015 | Cleereman et al. | |
| 9,032,672 B2 | 5/2015 | Livsey et al. | |
| 9,147,786 B2 | 9/2015 | Keenihan et al. | |
| 9,169,646 B2 * | 10/2015 | Rodrigues | H02S 40/34 |
| 9,171,982 B2 | 10/2015 | Meyers | |
| 9,184,309 B2 * | 11/2015 | Baumbach | H01L 31/02008 |
| 9,196,756 B2 | 11/2015 | Cleereman et al. | |
| 9,202,955 B2 | 12/2015 | Livsey et al. | |
| 9,331,224 B2 | 5/2016 | Koch et al. | |
| 9,391,223 B2 | 7/2016 | Langmaid et al. | |
| 9,537,033 B2 | 1/2017 | Langmaid et al. | |
| 9,634,606 B2 | 4/2017 | Balyon | |
| 10,693,413 B2 | 6/2020 | Rodrigues | |
| 2006/0243318 A1 | 11/2006 | Feldmeier et al. | |
| 2011/0017279 A1 | 1/2011 | Baumbach | |
| 2012/0085040 A1 | 4/2012 | Ketwitz | |
| 2014/0024302 A1 | 1/2014 | Aandewiel et al. | |
| 2015/0162870 A1 * | 6/2015 | Beck | H02S 40/34 136/244 |

* cited by examiner

ROOF INTEGRATED PHOTOVOLTAIC SYSTEM

CROSS REFERENCE TO RELATED APPLICATIONS

The present Patent Application is a continuation of previously filed, co-pending U.S. patent application Ser. No. 16/160,598, filed Oct. 15, 2018, which priority is hereby claimed to the filing date of U.S. provisional patent application 62/574,560 filed on Oct. 19, 2017 and entitled Solar Panel System.

INCORPORATED BY REFERENCE

U.S. patent application Ser. No. 16/160,598, filed Oct. 15, 2018 and U.S. Provisional Patent Application No. 62/574,560, filed Oct. 19, 2017, are specifically incorporated by reference herein as if set forth in their entireties.

TECHNICAL FIELD

The invention disclosed herein relates generally to photovoltaic energy production and more specifically to a roof integrated photovoltaic systems having thin low profile solar tiles that mimic a traditional roofing tile.

BACKGROUND

Roof integrated photovoltaic (RIPV) systems are continually becoming more available and more affordable. These systems have evolved in recent years such that many of them no longer present a bulky industrial and unsightly appearance on a roof. The solar tiles or, more appropriately solar tiles, of these systems have become increasingly thinner. In fact, some solar tiles are less than half an inch thick and resemble traditional slate or asphalt shingles when installed in courses on a roof. This is good for consumers because modern RIPV systems can actually be architecturally pleasing and desirable while also producing sustainable electrical energy from sunlight.

As demand for thinner and lower profile solar tiles has grown, a problem has arisen with the electrical connector systems on solar tiles and solar tiles that are used to interconnect the solar tiles of a RIPV array together electrically. More specifically, these connectors traditionally are on the terminal ends of wires that extend from junction boxes mounted to the backs of solar tiles. This limits the thinness of a solar tile assembly to the thickness of the tile itself plus the thickness of its junction box and/or connectors. A need exists for an RIPV system wherein the thinness of individual solar tiles is not limited by the electronic junction boxes or connectors of the tile. It is to the provision of such a RIPV system that the present invention is primarily directed.

SUMMARY

Briefly described, an RIPV system is made up of individual solar tiles that are installable in courses on a roof to produce electrical energy when exposed to sunlight. In a preferred embodiment, the tiles resemble traditional slate shingles in size and appearance. The tiles may be mounted to a roof using a batten and hanger system such as the TruSlate® system available from GAF of Parsippany, N.J., or some other mounting system appropriate for securing the solar tiles to a roof. When so mounted, the forward edge of each solar tile in a course overlaps slightly the back edge of a tile or tiles in a next lower course. Rainwater is shed from course to course and eventually directed off the roof at its eves.

Each solar tile of the system is provided with an edge connector or edge junction with which it is electrically connected to adjacent tiles using cables. The edge junction serves the function of a junction box on the back of a traditional solar panel in that electrical energy produced by the solar cells of the tile is directed to the edge junction. Sockets on opposed ends of the edge junction receive plugs of cables that interconnect the tiles electrically together. The edge junction is thin and projects rearwardly from the back edge of its tile so that it is substantially coextensive with the solar tile itself or at least contains the plane of the solar tile.

It will be recognized that the thinness of each solar tile is not limited by the thickness of its electrical edge junction because the electrical junction is mounted on an edge of the solar tile rather than on its back surface. In one embodiment, the edge junction is slightly thicker than the solar tile itself such that tiles of one course may rest on the connectors of tiles in a next lower course. As a consequence, the front edges of tiles in the upper course are held slightly above the top surfaces of tiles in the lower course. This provides ventilation beneath the solar tiles of the system to help maximize the efficiency of the tiles. It also creates a space adjacent the top edge of each tile to accommodate cables and their plugs.

Thus, an RIPV system is presented in which the individual solar tiles can be thin and may resemble traditional roofing tiles. The tiles are simple to interconnect with cables during installation, are easy to remove if necessary for replacement or maintenance, provide for ventilation beneath the installed tiles, and define an accommodating space for cables and their plugs. These and other aspects, features, and advantages of the RIPV system will be understood better upon review of the detailed description set forth below taken in conjunction with the accompanying drawing figures, which are briefly described as follows.

DETAILED DESCRIPTION OF THE EXAMPLE EMBODIMENTS

Figure 1:
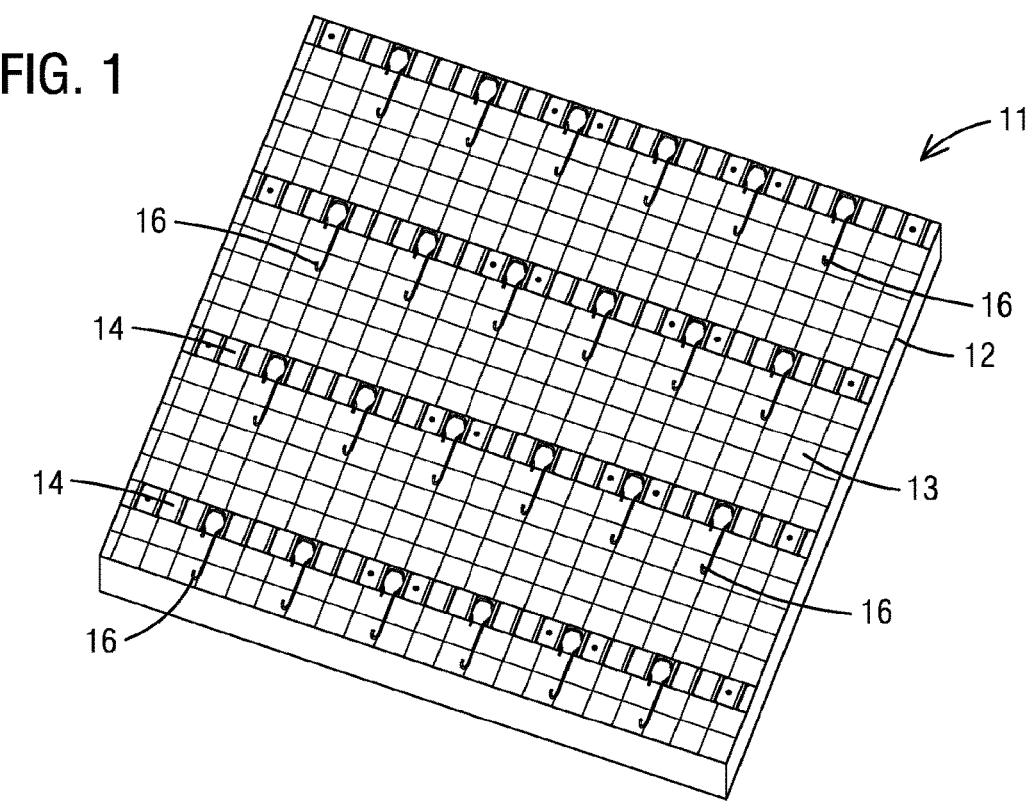
FIG. 1 shows one common batten-and-hanger system known as the TruSlate® system for installation of slate roofing tiles on a roof deck.

Reference will now be made in more detail to the drawing figures, wherein like reference numerals refer to like parts throughout the several views. The invention is described and depicted herein within the context of solar tiles for installation using the TruSlate® metal batten and hanger system available from GAF. This system is described in detail in U.S. Pat. Nos. 8,033,072; 7,454,873; and 7,448,117 and these patents are hereby incorporated by reference. It will be understood, however, that the invention is not limited to being installed using this particular hanger system or any hanger system at all. In fact, any system for installing solar tiles on a roof deck may be used such as, for instance, rack systems, frame systems, headlap fasteners, or any other system. The TruSlate® batten and hanger system is used herein for convenience and as an example to add clarity and context to the discussion.

FIG. 1 shows a section of a pitched roof 11 to which a TruSlate® style batten and hanger system has been attached for supporting roof tiles according to the incorporated U.S. patents. The roof 11 has a roof deck 12 covered with a waterproofing underlayment 13. A plurality of metal battens 14 are attached to the roof deck with screws 17 (FIG. 2) in a vertically spaced array. The battens 14 are configured to receive and secure a plurality of spring steel hangers 16. Each hanger is formed with a batten attachment feature at its top end and an upwardly arching crook at its bottom end. For this application, the bottom ends of the hangers are coated in an electrical insulator to avoid electrical contact between solar tiles and the metal batten system.

Figure 2:
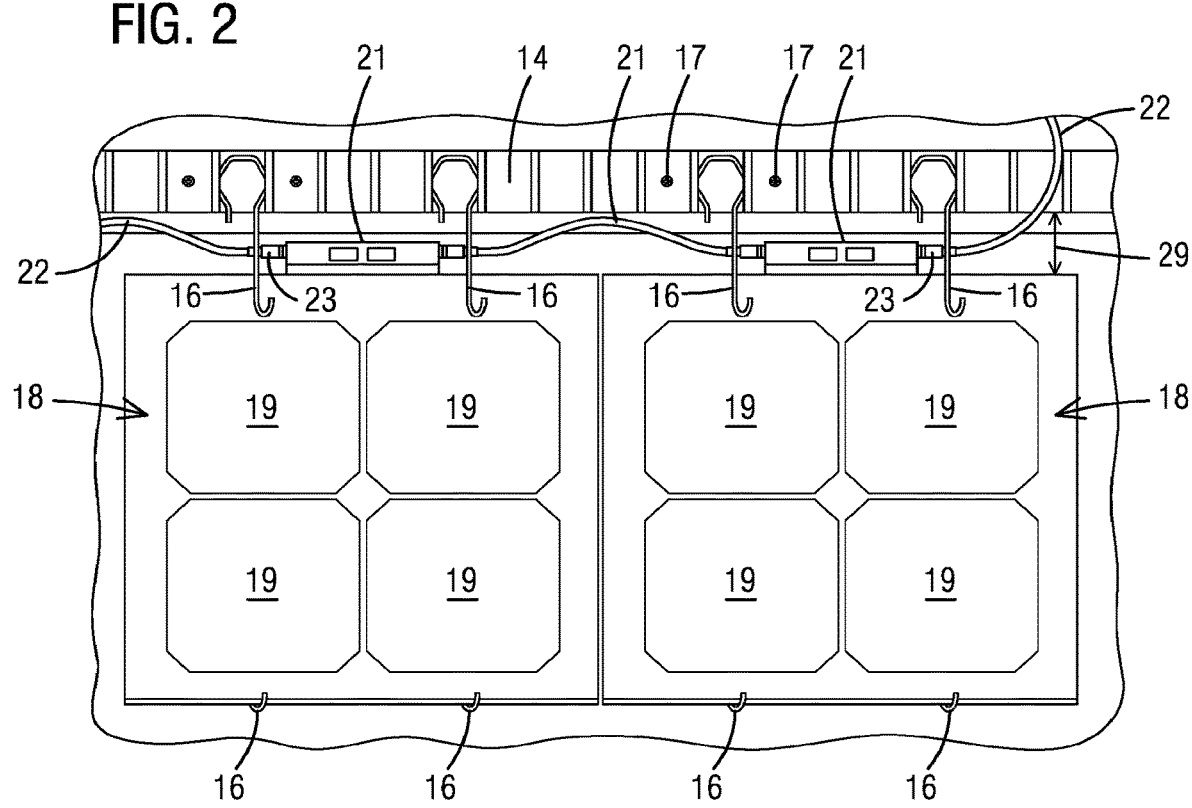
FIG. 2 shows two solar tiles according to the present invention supported side-by-side by the TruSlate® hanger system of FIG. 1.

FIG. 2 shows two solar tiles 18 according to the invention supported on the roof deck 12 by the batten and hanger system shown in FIG. 1. Each solar tile 18 has an array of solar cells 19 covered with a layer of transparent or translucent protective material such as tempered glass. The top or upper edges of the solar tiles 18 are captured beneath a pair of hangers 16 depending from the batten 14 directly above the tiles 18. The bottom edges of the solar tiles 12 are nestled in the crooked bottom ends of hangers that depend from the batten 14 beneath the solar tiles 18 (not visible). In this way, 4 hangers hold the solar tiles securely to the roof and the spring steel nature of the hangers prevent uplift of the tiles in windy conditions. A gap or space 29 is formed between the top edges of the solar tiles 18 and the batten 14 directly above the solar tiles to accommodate cables used to interconnect the tiles electrically.

Each solar tile 19 is provided with an edge junction 21 extending rearwardly from the top edge of the tile. The edge junctions 21 contain wires that connect electrically to and receive electrical energy from the solar cells 19 of the tile. The edge junctions are co-extensive with the solar tiles or at least contain the plane of the solar tile. In one embodiment, the edge junctions 21 are a bit thicker than the solar tiles themselves, which provides for benefits described below. Each edge junction has opposite ends 26 and 27 (FIG. 6) that form electrical sockets. These sockets are configured to receive a plug 23 on the end of an electrical cable 22 for electrically interconnecting solar tiles together in a grid.

The edge junctions 21, plugs 23, and cables 22 are located and contained within the accommodating space 29 defined between the tiles 18 and the upper batten 14. The cables 22 extend beneath the hangers 16 that hold down the top edges of the solar tiles. Cables 22 between side-by-side solar tiles have some slack as shown in the drawing. The cable 22 at the right end of a course of solar tiles extends upwardly through a gap in the upper batten to connect electrically to a next higher course of solar tiles. The slack in cables 22 connecting side-by-side solar tiles allow for easy removal and replacement of a solar tile in the event of a defective tile, as detailed below.

Figure 3:
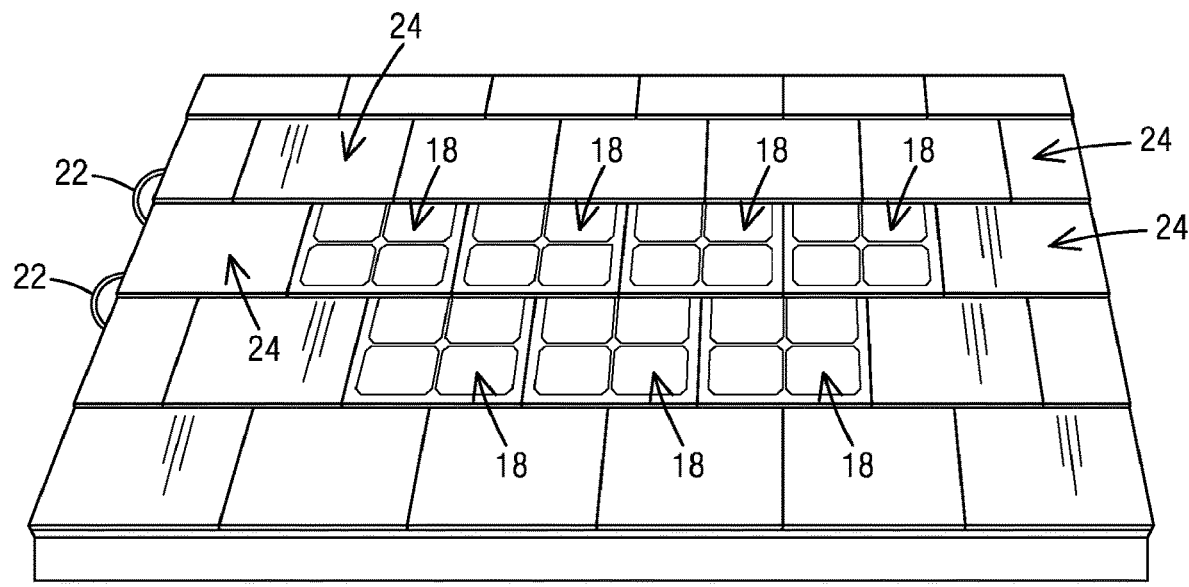
FIG. 3 shows a plurality of solar tiles of the present invention mounted on a roof deck along with non-solar tiles to form a roof covering.

FIG. 3 shows the roof section covered with solar tiles arranged in courses according to the invention. The illustrated installation comprises a plurality of solar tiles 18 installed using the batten and hanger system as described. A plurality of non-functional tiles is also installed on the batten and hanger system. The non-functional tiles are made to mimic the appearance of the solar tiles on a roof so that the outline of the solar tile array on a roof is not obvious to an observer. Electrical cables 22 are seen extending between adjacent courses of solar tiles to connect the courses together in an electrical grid.

Figure 4:
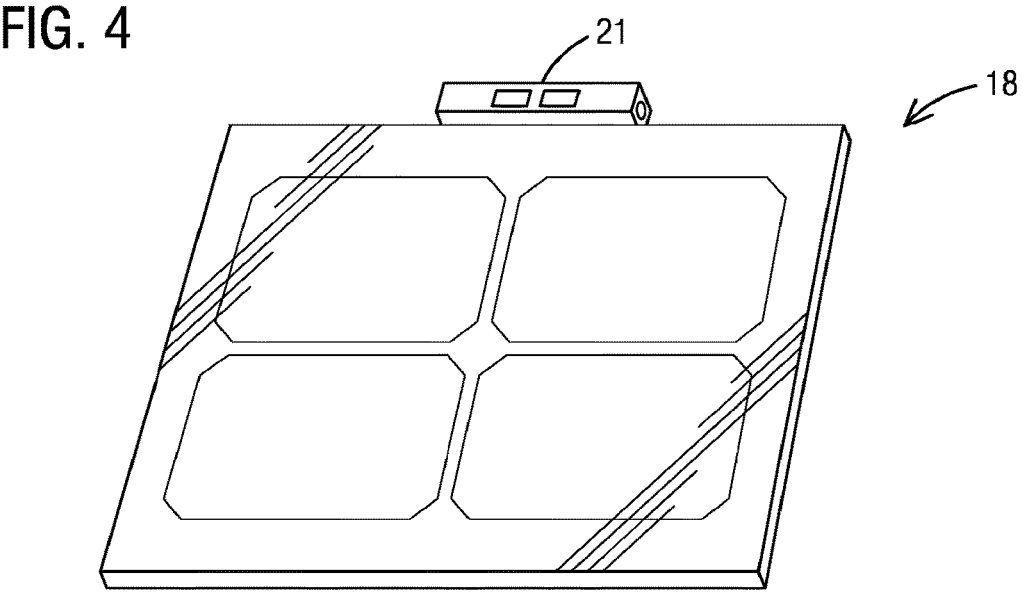
FIG. 4 is a right front perspective view of a single solar tile incorporating aspects of the present invention in one form.
Figure 4A:
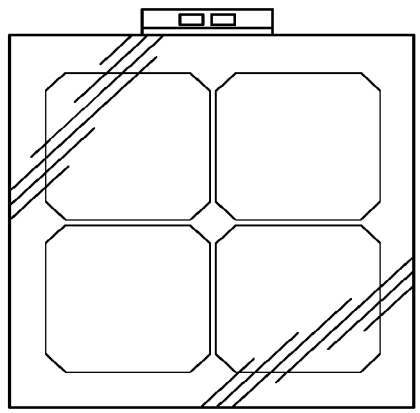
FIGS. 4a-4d show possible surface decorations or features that can be applied to the top surfaces of solar tiles to enhance their appearance.
Figure 4B:
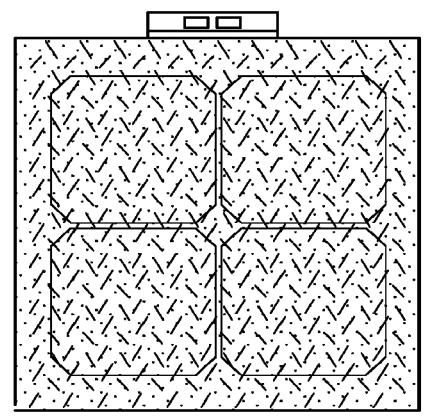
Figure 4C:
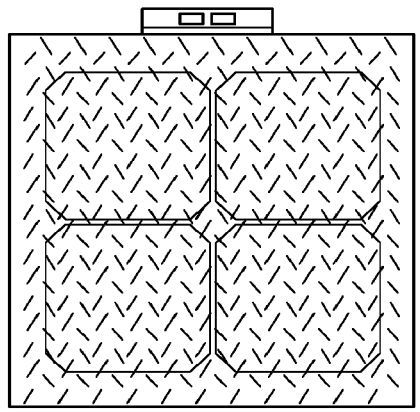
Figure 4D:
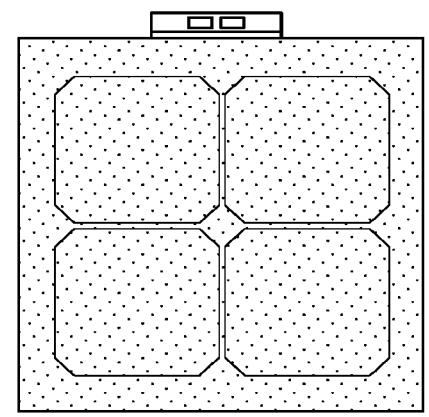

FIG. 4 is a perspective view of a solar tile 18 according to the invention. Edge junction 21 is seen attached to and extending rearwardly from the top edge of the solar tile. The upper or exposed surface of the solar tile 18 may be formed with various textures and patterns if desired to present the appearance of a traditional shingle such as a slate roofing tile or a cedar shake shingle. For example, and without limitation, the surface may be smooth as shown in FIG. 4*a*, satin with an embossed texture as shown in FIG. 4*b*, textured as shown in FIG. 4*c*, or satin without texture as shown in FIG. 4*d*.

The textures formed in the top surface can be etched, embossed, formed during manufacture, printed or otherwise applied and can mimic virtually any traditional roofing or shingle product. The solar tiles can even be curved or otherwise shaped to mimic, for instance, barrel style shingles. In fact, completely unique roofing motifs may be created such as width the satin shingle of FIG. 4*d*.

Figure 5:
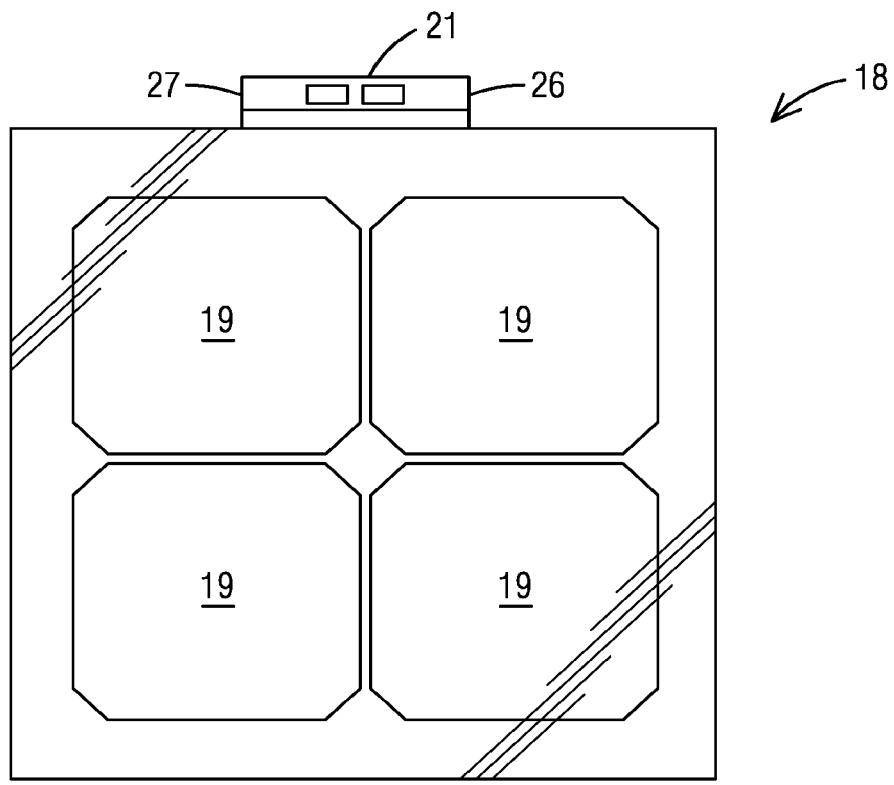
FIG. 5 is a top plan view of the solar tile of FIG. 4

FIG. 5 is a top plan view of a solar tile according to the invention. The tile 18 has embedded solar cells 19 that are electrically coupled to an edge junction 21 along the top edge of the tile. As discussed above, the edge junction has opposed ends 26 that are formed with sockets for receiving the plugs of electrical cables. The edge junction may be attached to its solar tile with an appropriate adhesive, may have a flange that is connected to the back surface of the tile, or may be secured in any appropriate manner. Any technique of attaching the edge junction to the tile so that it is coextensive with or contains the plane of the solar tile is within the scope of the invention.

Figure 6:
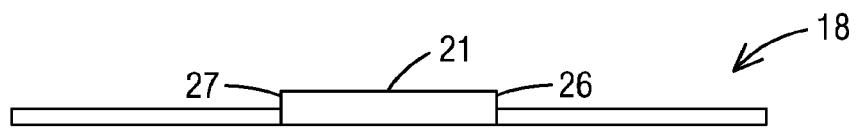
FIG. 6 is a back elevational view of the solar tile of FIG. 4.
Figure 7:
FIG. 7 is a side elevational view of the solar tile of FIG. 4.

FIG. 6 shows a solar tile according to the invention as seen from the top edge thereof. In this figure, it can be seen that the edge junction is slightly thicker than the solar tile itself. The edge junction can thus be said to "contain" the plane of the solar tile in this example. The slightly thicker edge junction provides certain advantages in an installed array of solar tiles. For instance, solar tiles in one course may rest on the slightly thicker edge junctions of solar tiles in a next lower course when installed. As a result, the bottom edge portions of the tiles in the upper course are raised slightly above the upper surfaces of the tiles in the next lower course. This, in turn, provides for ventilation beneath the solar tile array to help maintain the temperature of the solar tiles within an optimum range for operation and defines an accommodating space for cables and plugs adjacent the upper edges of the tiles. FIG. 7 is a side edge view of a solar tile 18 according to the invention.

Figure 8:
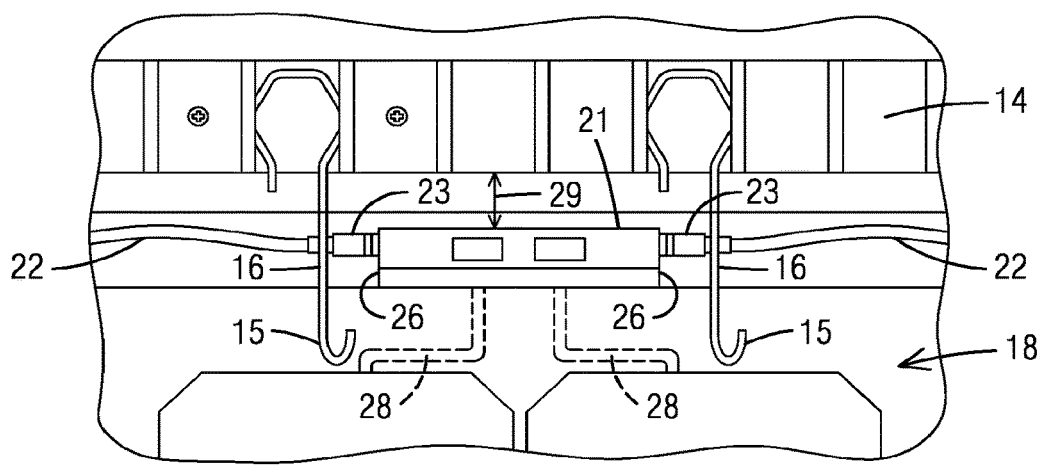
FIG. 8 is a close-up view of the back edge of a tile according to this invention showing the edge junction extending rearwardly from the back edge of the tile and having cables connected to its ends.

FIG. 8 is a close-up view of the top edge of a solar tile 18 mounted to the batten and hanger system according to the exemplary embodiment of the invention. The edge junction 21 is seen extending rearwardly from the top edge of the tile and electrical conductors 28 couple the solar cells of the tile electrically to the edge junction. End plugs 23 of electrical cables 22 are seen attached to the sockets on the opposed ends 26 of the edge junction. The edge junctions 21, plugs 23, and cables 22 fit and are contained within the accommodating space 29 between the top of the solar tile 18 and the next higher batten 14. Spring steel hangers 16 hold the top edge portion of the solar tile 18 down and the insulation coated hooks 15 of the hangers are positioned to receive the bottom edges of solar tiles in a next higher course.

Figure 9:
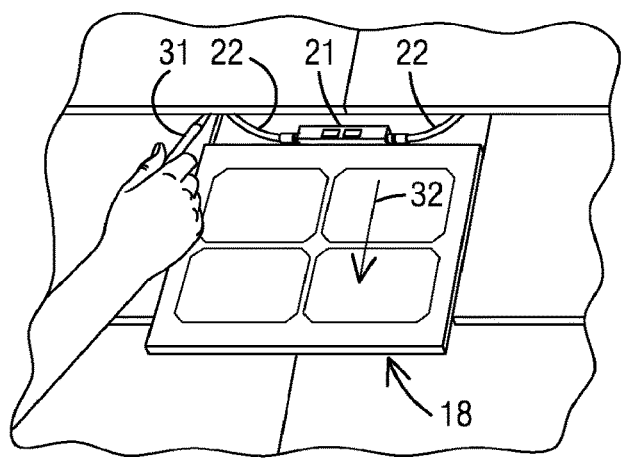
FIGS. 9 and 10 show removal of a solar tile from an installed system of tiles for repair or replacement according to aspects of the invention.
Figure 10:
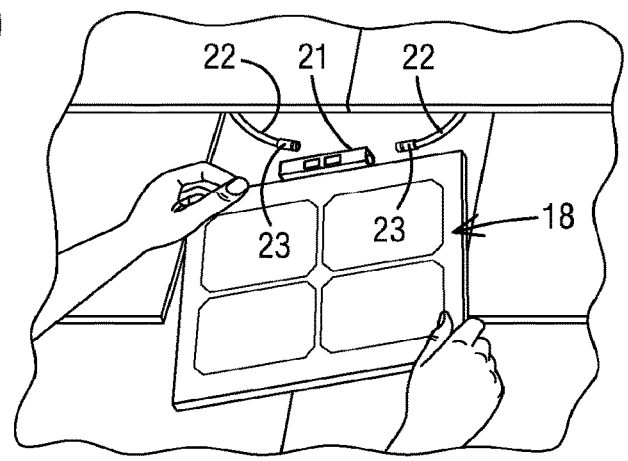

It is possible for a solar tile within an installed solar array to become defective or otherwise need repair or replacement in the future. Unlike many prior art roof integrated solar systems, the illustrated embodiment of the present invention makes this process very simple and easy to accomplish as shown in FIGS. 9 and 10. In FIG. 9 a worker is seen using a pry tool 31 to lift up slightly the solar tiles 18 of the course immediately above the solar tile to be replaced. With the upper solar tiles lifted, the defective solar tile 18 can be snapped out of the crooked ends of hangers that hold its bottom edge in place and slid down as indicated by arrow 32. This motion is facilitated by the previously described slack in cables 22.

As the solar tile slides from beneath the tiles in the next higher course, its edge junction 21 and cables 22 are exposed to the worker. The worker can then disconnect the plugs 23 from the opposed ends of the edge junction and remove the defective tile. To replace the removed tile, the process is reversed. The plugs 23 of cables 22 are re-connected to the sockets on the opposed ends of the edge junction of the replacement tile. The replacement tile is then simply slid upwardly beneath the solar tiles of the next higher course until it becomes captured beneath the hangers beneath that course. The bottom edge of the replacement tile is then snapped into the crooked ends of its hangers and the replacement task is complete.

The invention has been described herein in terms of preferred embodiments and configurations considered by the inventors to represent preferred modes of carrying out the invention. It will be understood by the skilled artisan, however, that the inventive concepts so embodied are not limited to the specific examples described above. For example, the solar tiles have been described as being substantially square to resemble a traditional slate-style shingle. The invention can be embodied in other solar tile sizes and designs to mimic, for instance, asphalt shingles or even to present a new and non-traditional aesthetic on the roof of a home.

The RIPV system has been illustrated as being installed using a batten and hanger system. However, any installation technique may be used within the scope of the inventive concept. These and other modifications and additions, both subtle and gross, may well be made to the illustrated and exemplary embodiments herein without departing from the spirit and scope of the invention.

What is claimed is:

1. A roof system, comprising:
a roof deck;
a roof integrated photovoltaic (RIPV) system mounted on the roof deck and including:
a plurality of solar tiles arranged in courses along the roof deck, each solar tile defining a plane and having an upper edge, a lower edge, side edges, a plurality of solar cells, and an at least partially transparent protective top layer overlying the solar cells and having an upper surface;
a series of edge junctions each located along at least one edge of a corresponding solar tile and extending in a direction substantially coextensive with the plane defined by its corresponding solar tile, each edge junction electrically coupled to the plurality of solar cells of its corresponding solar tile;
a first electrical connector and a second electrical connector coupled to each edge junction and configured to releasably engage mating connectors of electrical cables for electrically connecting the solar tiles of the plurality of solar tiles together; and
the edge junction of each solar tile having a thickness greater than a thickness of its associated solar tile sufficient to support a lower edge of a solar tile of a next higher course of solar tiles above the upper surface of the solar tile to provide a ventilation space between the solar tiles.

2. A roof system as claimed in claim 1 wherein the first electrical connector is on the first end of the edge junction, and the second electrical connector is on the second end of the edge junction.

3. A roof system as claimed in claim 1 wherein the edge junction is on the upper edge of each solar tile and wherein the lower edge of each solar tile in a higher course of solar tiles rests on the edge junction of a solar tile in a lower course of solar tiles, defining an accommodating space adjacent the upper edges of the solar tiles and in which the edge junction and electrical cables are received.

4. A roof system as claimed in claim 1 wherein each solar tile has an exposed surface that is textured.

5. A roof system as claimed in claim 4 wherein the exposed surface is configured to resemble a roofing tile or shingle.

6. A roof system as claimed in claim 4 wherein the exposed surface is textured to resemble a slate tile.

7. A roof system as claimed in claim 4 wherein the exposed surface is textured to resemble an asphalt shingle.

8. A roof system as claimed in claim 4 wherein the exposed surface is smooth.

9. A roof system as claimed in claim 4 wherein the exposed surface has a satin appearance.

10. A roof system as claimed in claim 1 wherein each solar tile is supported by hooks of retainers connected to battens beneath the plurality of solar tiles.

11. A roof system comprising:
a roof deck;
a roof integrated photovoltaic (RIPV) system including an array of solar tiles arranged on the roof deck in at least a lower course and a higher course, each solar tile comprising a plurality of solar cells and an at least partially translucent protective layer covering the solar cells and defining an upper surface of the solar tile;
an edge junction arranged along an upper edge of each solar tile, the edge junction substantially co-extensive with or containing a plane defined by the solar tiles and having a thickness greater than a thickness of the solar tile such that the solar tiles of the higher course of solar tiles are supported above the upper surface of the solar tiles of the lower course of solar tiles so as to define a ventilation space between the solar tiles; and
first and second electrical connectors coupled to the edge junction and to corresponding electrical cables for electrically connecting the solar tiles together, the first and second electrical connectors configured to releasibly engage with the edge junction and with mating connectors of the electrical cables to facilitate disconnection and replacement of one or more solar tiles of the array of solar tiles.

12. The roof system of claim 11, wherein the lower edge of each solar tile rests on the edge junction of a solar tile in a next lower course of solar tiles, in an accommodating space adjacent the upper edges of the solar tiles and in which the edge junction and electrical cables are received.

13. The roof system of claim 11, wherein each solar tile is supported by hooks of retainers connected to battens mounted in the roof deck beneath the plurality of solar tiles.

14. The roof system of claim 11, further comprising an underlayment applied over the roof deck, and over which the array of solar tiles is mounted.

15. The roof system of claim 11, further comprising a series of non-functional panels arranged adjacent the solar tiles.

16. The roof system of claim 11, wherein each solar tile further comprises an exposed surface configured to resemble a roofing tile or shingle.

17. The roof system of claim 11 wherein each solar tile further comprises an exposed surface that is textured.

18. The roof system of claim 11 wherein each solar tile further comprises an exposed surface that is smooth.

* * * * *